(12) United States Patent
Broad et al.

(10) Patent No.: US 7,673,426 B2
(45) Date of Patent: Mar. 9, 2010

(54) WINDOW SILL FLASHING

(75) Inventors: Robert Patrick Broad, Ypsilanti, MI (US); Jay K. McDonald, White Lake, MI (US)

(73) Assignee: PNII, Inc., Bloomfield Hills, MI (US)

( * ) Notice: Subject to any disclaimer, the term of this patent is extended or adjusted under 35 U.S.C. 154(b) by 108 days.

(21) Appl. No.: 11/281,986

(22) Filed: Nov. 17, 2005

(65) Prior Publication Data
US 2006/0075700 A1 Apr. 13, 2006

Related U.S. Application Data

(63) Continuation of application No. 10/871,401, filed on Jun. 18, 2004.

(60) Provisional application No. 60/487,343, filed on Jul. 15, 2003.

(51) Int. Cl.
*E06B 1/04* (2006.01)

(52) U.S. Cl. .................. 52/204.1; 52/204.53; 52/656.5

(58) Field of Classification Search ................ 52/302.6, 52/204.53, 204.54, 658, 656.6, 656.5, 655.7; 156/71
See application file for complete search history.

(56) References Cited

U.S. PATENT DOCUMENTS

| 385,065 | A | 6/1888 | Milroy |
|---|---|---|---|
| 448,501 | A | 3/1891 | Bussert |
| 665,958 | A | 1/1901 | Dugan |
| 1,677,130 | A | 7/1928 | Cherry |
| 1,875,495 | A | 9/1932 | Reese |
| 2,095,072 | A | 10/1937 | Ludden |
| 2,129,381 | A | 9/1938 | Oftedal et al. |
| 2,482,170 | A | 9/1949 | Gunnison |
| 2,648,107 | A | 8/1953 | Bates |
| 2,697,932 | A | 12/1954 | Goodwin |
| RE25,590 | E | 6/1964 | Miller |
| 3,527,012 | A | 9/1970 | Hemminger |
| 3,851,420 | A | 12/1974 | Tibbetts |
| 3,854,246 | A | 12/1974 | McAllister |
| 4,055,917 | A | 11/1977 | Coller |
| 4,098,027 | A | 7/1978 | Crance |
| 4,411,104 | A | 10/1983 | St. Aubin |
| 4,555,882 | A | 12/1985 | Moffitt et al. |
| 4,663,905 | A | 5/1987 | Schulz |
| 4,700,512 | A * | 10/1987 | Laska ............................ 52/58 |
| 4,972,638 | A | 11/1990 | Minter |
| 5,115,605 | A * | 5/1992 | Butler ......................... 52/105 |
| 5,349,792 | A * | 9/1994 | Bayes ........................... 52/62 |

(Continued)

OTHER PUBLICATIONS

Window Installation-An Evolving Challenge, Butt, T. K., FAIA, Nov. 8, 2004, pp. 1-13.

(Continued)

*Primary Examiner*—David Dunn
*Assistant Examiner*—Daniel Kenny
(74) *Attorney, Agent, or Firm*—Dobrusin & Thennisch PC

(57) ABSTRACT

The present invention is directed towards a window sill flashing comprising a base having a substantially rectangular shape. A front flange projects perpendicularly downward from a front edge of the base and at least one side flange extends vertically from a side edge of the base. The side flange includes a front surface. The window sill flashing is made from a rigid homopolymer vinyl film.

15 Claims, 10 Drawing Sheets

U.S. PATENT DOCUMENTS

| | | | |
|---|---|---|---|
| 5,377,464 A | 1/1995 | Mott et al. | |
| 5,542,217 A | 8/1996 | Larivee, Jr. | |
| 5,653,072 A | 8/1997 | Seelandt et al. | |
| 5,899,026 A | 5/1999 | Williams et al. | |
| 5,924,259 A | 7/1999 | Marousek | |
| 6,038,821 A | 3/2000 | Larson et al. | |
| 6,041,560 A | 3/2000 | Larson et al. | |
| 6,045,921 A * | 4/2000 | Restaino et al. | 428/500 |
| 6,098,343 A | 8/2000 | Brown et al. | |
| 6,212,834 B1 | 4/2001 | Lindgren | |
| 6,219,979 B1 | 4/2001 | Lohr | |
| 6,244,001 B1 | 6/2001 | Anastasi | |
| 6,269,591 B1 | 8/2001 | Kelly | |
| 6,305,132 B1 | 10/2001 | Smith | |
| 6,371,188 B1 | 4/2002 | Baczuk et al. | |
| 6,385,925 B1 | 5/2002 | Wark | |
| 6,401,401 B1 | 6/2002 | Williams | |
| 6,401,402 B1 | 6/2002 | Williams | |
| 6,484,446 B2 | 11/2002 | Young | |
| 6,681,530 B1 * | 1/2004 | Givens | 52/58 |
| 6,725,610 B2 | 4/2004 | Murphy et al. | |
| 6,868,643 B1 | 3/2005 | Williams et al. | |
| 6,941,713 B2 | 9/2005 | Williams et al. | |
| 2001/0034986 A1 * | 11/2001 | Thomas et al. | 52/211 |
| 2005/0034385 A1 | 2/2005 | Broad et al. | |
| 2005/0066598 A1 | 3/2005 | Williams | |

OTHER PUBLICATIONS

WILLFLASH®, Corner Accessory Pieces for Pan Flashing, http://www.willflash.net/problem.htm, Sep. 26, 2005.

Product Literature for Tyvek Flexwrap.

\* cited by examiner

WINDOW SILL FLASHING

RELATED APPLICATIONS

This application is a continuation of U.S. patent application Ser. No. 10/871,401, filed Jun. 18, 2004, which claims the benefit of U.S. Provisional Application No. 60/487,343, filed Jul. 15, 2003, the entire contents of both are herein incorporated by reference.

TECHNICAL FIELD

The present invention generally relates to building materials and more particularly relates to window sill flashing for a window frame to prevent the ingress of water.

BACKGROUND OF THE INVENTION

Typical wall construction techniques include forming a rough opening from framing members such that a window opening is formed. The bottom portion of the window opening (called the sill) is susceptible to rotting if water is not prevented from penetrating from around the window perimeter. Additionally, adjacent ceilings, plastered walls, and the like are susceptible to damage if rain-water infiltrates under the window sill.

Many systems are used to solve the problem of water intrusion. One method includes providing a means to collect and control the water that does infiltrate the window perimeter. Alternatively, surface sealing agents, such as caulk, expanding foam, and the like are used as filling agents to fill openings between the periphery of the window and the adjacent, wall surfaces. However, over time, the filling agents have a tendency to dry, crack and shrink, thereby exposing gaps which provide a passageway for water to infiltrate the window perimeter.

SUMMARY OF THE INVENTION

The present invention is directed towards a window sill flashing comprising a base having a substantially rectangular shape. A front flange projects perpendicularly downward from a front edge of the base and at least one side flange extends vertically from a side edge of the base. The side flange includes a front surface. The window sill flashing is made from a vacuum formed, rigid homopolymer vinyl film.

DETAILED DESCRIPTION

Figure 1:
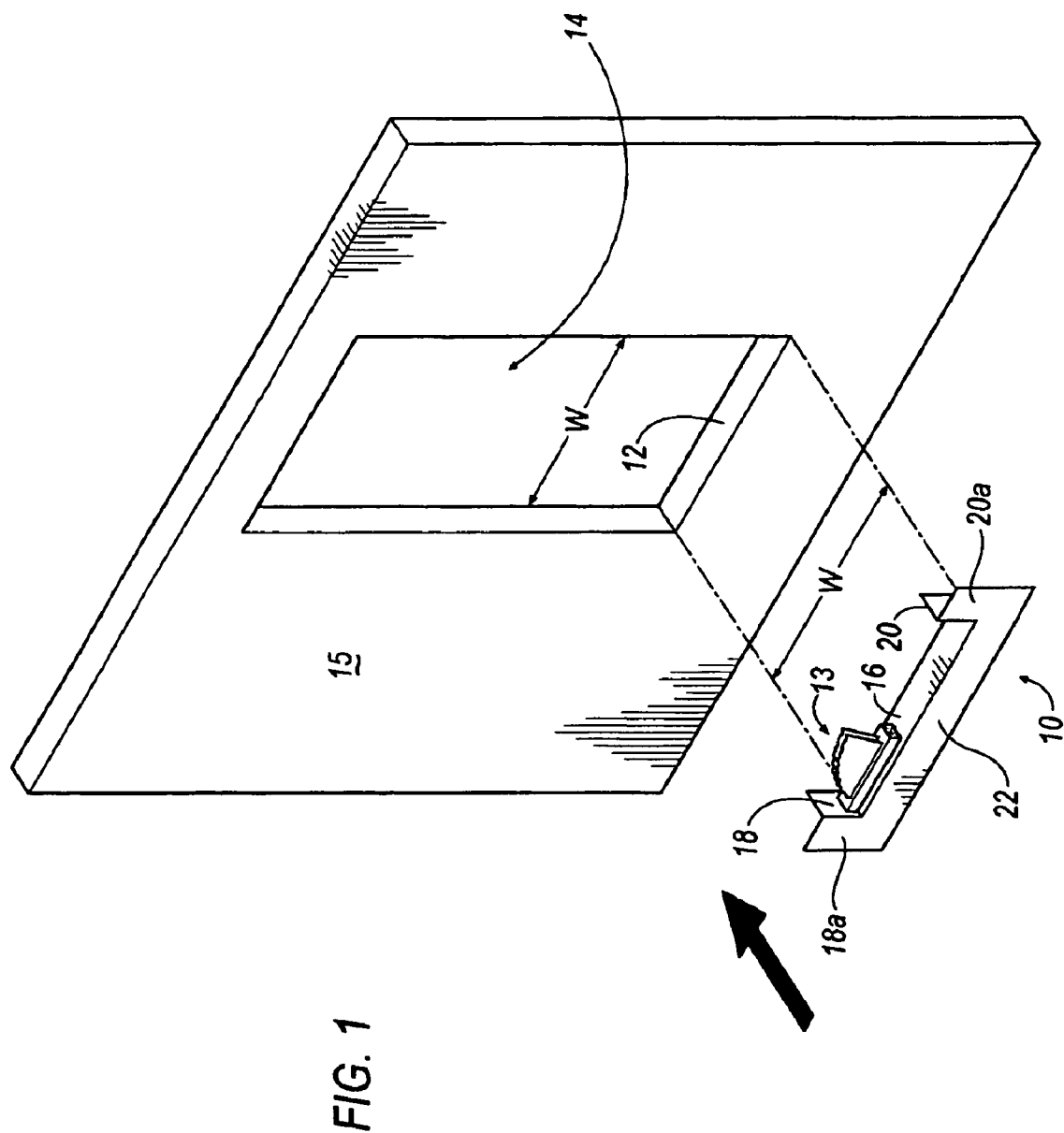
FIG. 1 is an isometric view of a wall having a window opening and a flashing according to an embodiment of the present invention.

Referring to FIG. 1, a window sill flashing (hereinafter referred to as "flashing") 10 is generally shown according to an embodiment of the present invention. The flashing 10 is formed to fit within and snugly conform to a bottom portion 12 of a window opening 14 of a wall 15. Window opening 14 has a width W and is adapted to accept a window assembly 13. As illustrated, the face portion (or flange) 22 of flashing 10 is generally U-shaped and constructed as one piece. The flashing 10 comprises a base 16, a first side flange 18 integrally formed with base 16 at one end, a second side flange 20 integrally formed with base 16 at an opposite end, and a front flange 22 integrally formed with base 16. Preferably base 16, side flanges 18, 20 and front flange 22 are all vacuum formed from a common sheet. Front (U-shaped) flange 22 extends perpendicularly downward from an edge of base 16. First side flange 18 includes a front surface 18a and second side flange 20 includes a front surface 20a. The flashing 10 is glued, calked, taped, or otherwise permanently secured within window opening 14. It is contemplated that flashing 10 of FIG. 1 is formed in various standard size lengths and widths to accommodate various standard window openings 14 and wall thicknesses.

Figure 3:
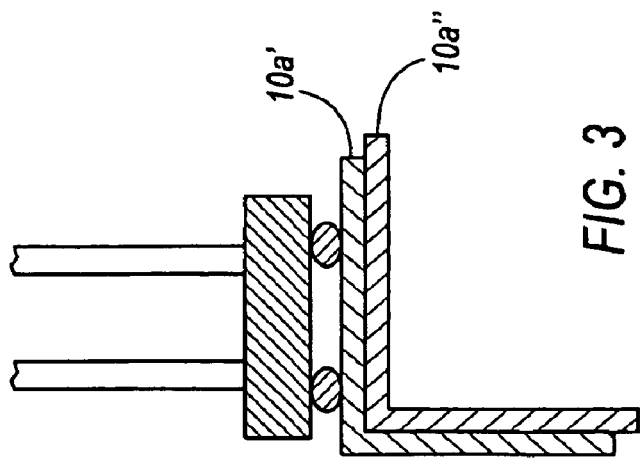
FIG. 3 is a cross-sectional view taken along line 3-3 of FIG. 2.
Figure 2:
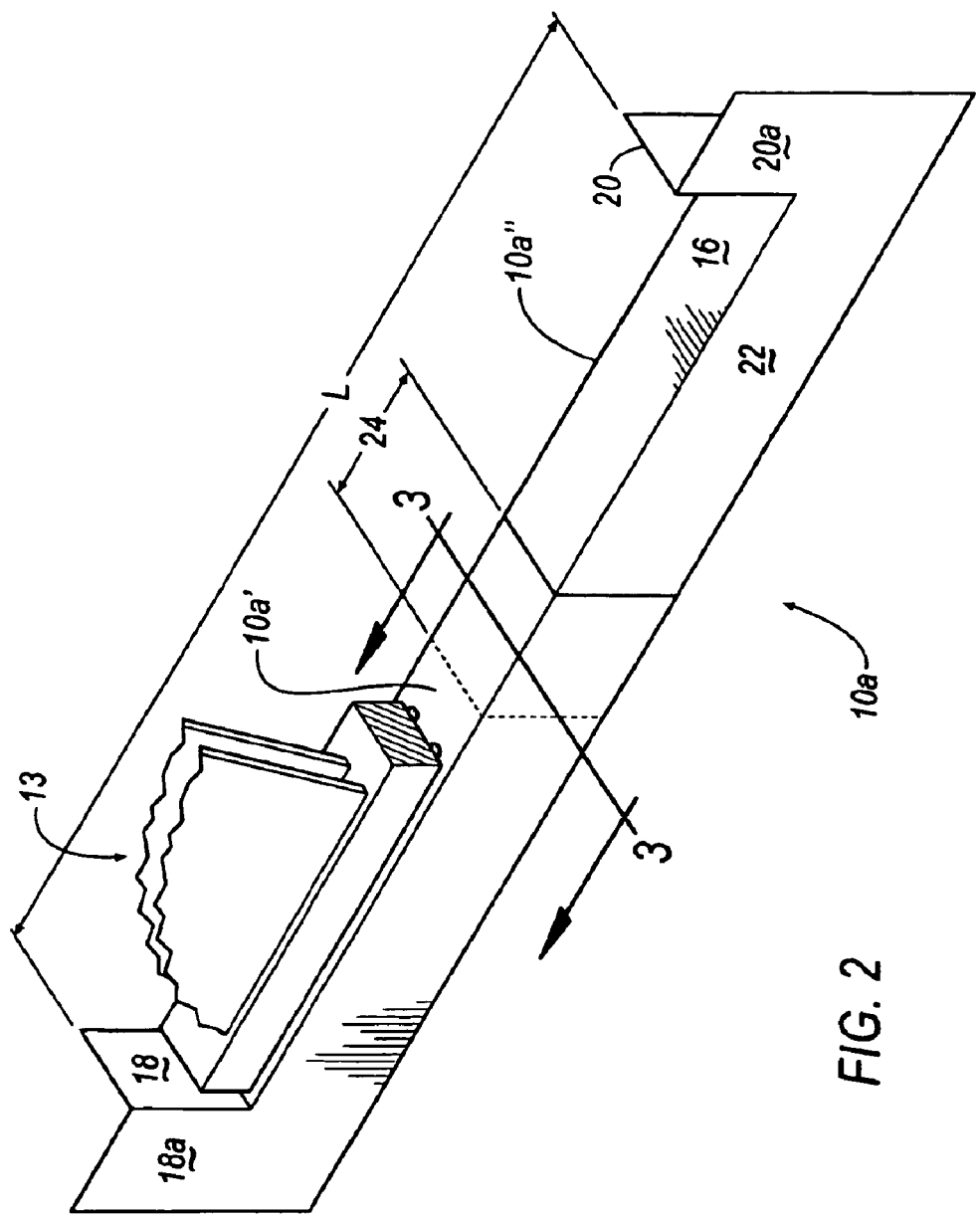
FIG. 2 is an isometric view of a flashing and window assembly according to an embodiment of the present invention.

FIGS. 2 and 3 illustrate a first alternative embodiment of the flashing of FIG. 1, wherein like features are indicated by the same reference number. Flashing 10a is fabricated as two separate portions 10a' and 10a". Portions 10a' and 10a" form the left and right side of flashing 10. Alternatively, flashing 10a is fabricated as a one piece member with a length (prior to cutting) that spans beyond the width W of window opening 14. Prior to installation of flashing 10a into window opening 14, flashing 10a is cut, resulting in portions of flashings 10a' and 10a". It can be appreciated that flashing 10a may be cut at any point along its length, so long as flashings 10a' and 10a" fit within window opening 14. Thereafter, portions 10a' and 10a" are placed so that they partially overlap one another in a region 24 producing flashing 10a having length L that is generally equal to the width W of window opening 14. FIG. 3 is a cross-sectional view of the overlap region 24 of portions 10a' and 10a". One advantage of flashing 10a is that flashing 10a may be cut to size in the field to accommodate any width W of window opening 14.

Figure 5:
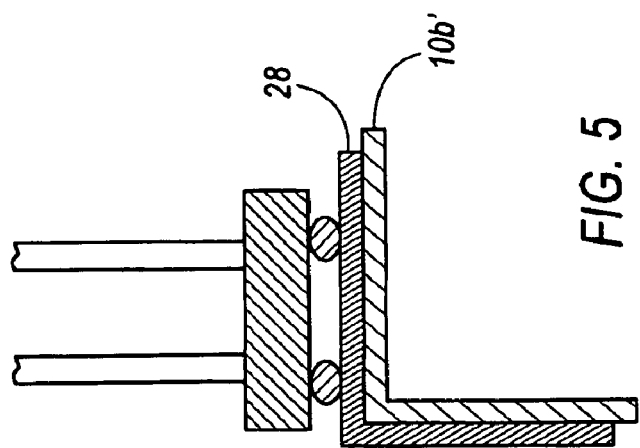
FIG. 5 is a cross-sectional view taken along line 5-5 of FIG. 4.
Figure 4:
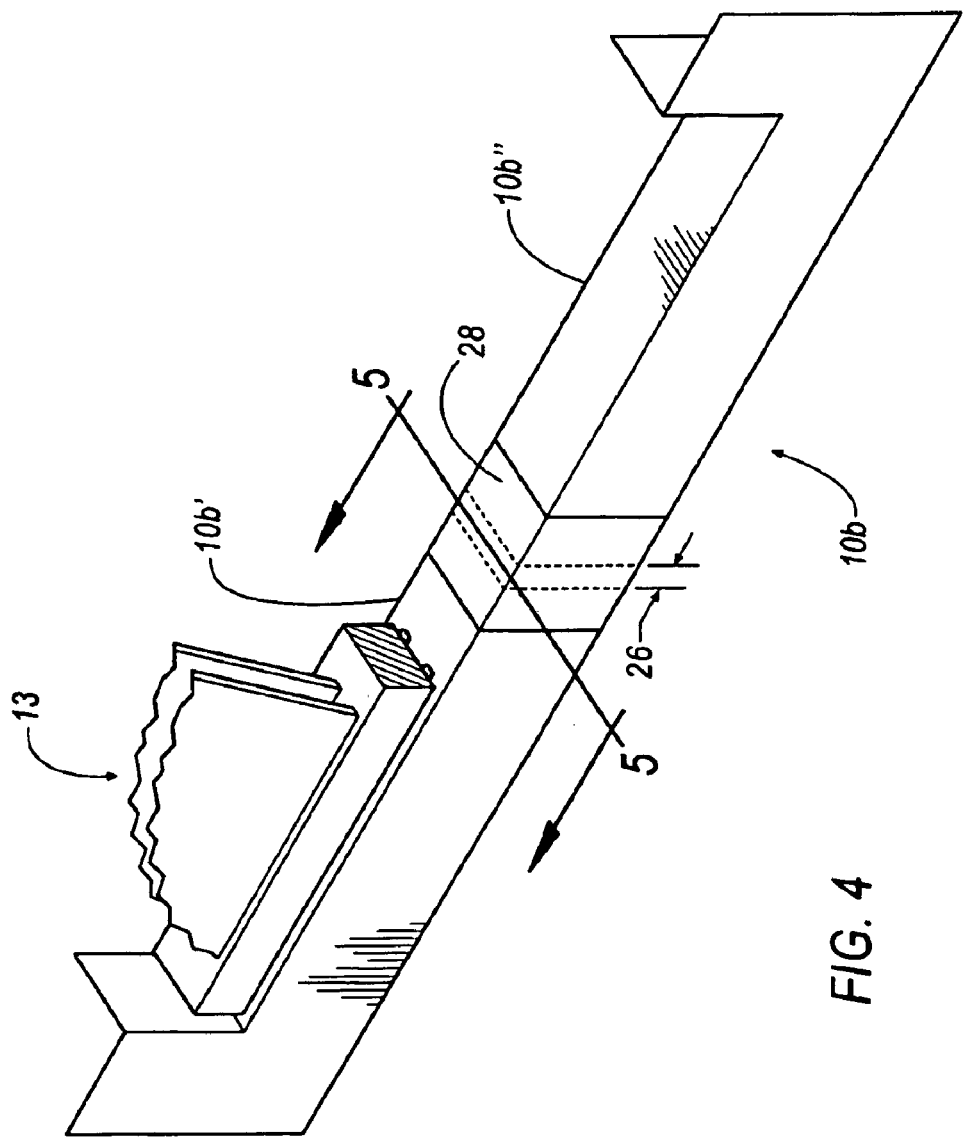
FIG. 4 is an isometric view of the flashing and window assembly according to an alternate embodiment of the present invention.

FIGS. 4 and 5 illustrate a further alternate embodiment of the flashing of the present invention. Flashing 10b is similar to flashing 10 and flashing 10a, except portions of flashing 10b' and 10b" do not overlap at region 24. Instead, portions 10b' and 10b" are separated by a gap 26. As illustrated, gap 26 is narrow relative to the width W of window opening 14. However, it can be appreciated that gap 26 may be any desired length. For instance, gap 26 may expose a substantial portion of width W of window opening 14. Further, gap 26 may be optionally covered with a sill flashing cap 28.

Figure 7:
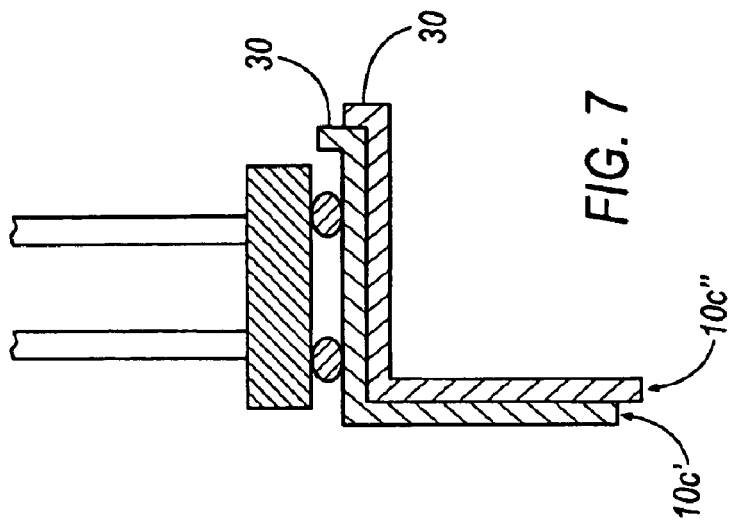
FIG. 7 is a cross-sectional view taken along line 7-7 of FIG. 6.
Figure 6:
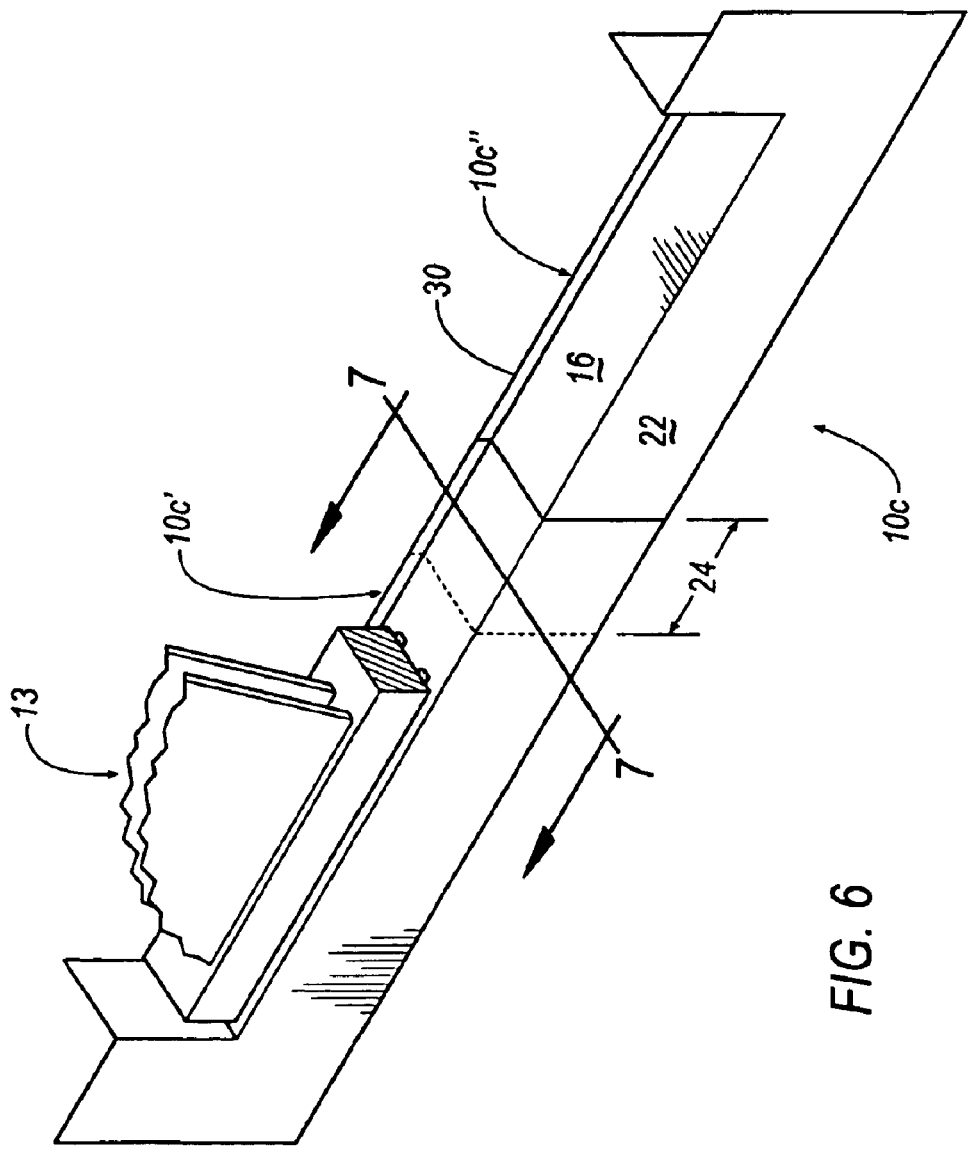
FIG. 6 is a isometric view of the flashing according to yet another alternate embodiment of the present invention.

FIGS. 6 and 7 illustrate a further embodiment of the flashing of the present invention. Flashing 10c is substantially similar to flashing 10a; however, flashing 10c includes a rear, vertical rising wall 30 to further impede the ingress of water. Rear, vertical rising wall 30 is located along an edge of base 16, opposite of front flange 22 and extends perpendicularly upward from base 16.

Figure 9:
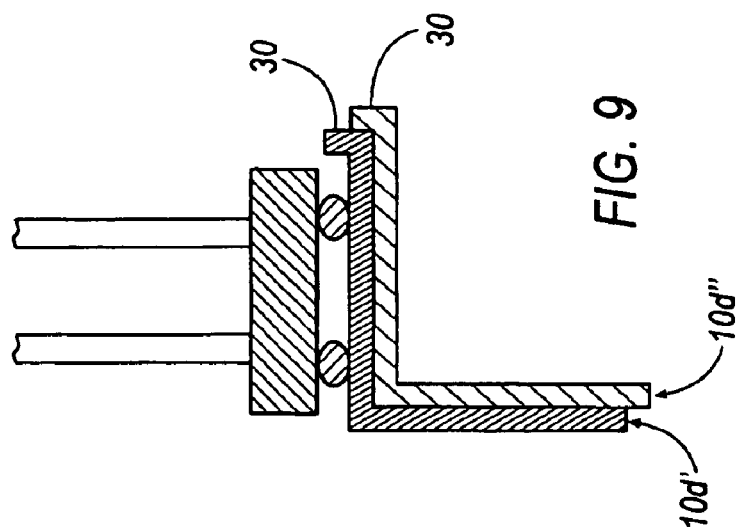
FIG. 9 is a cross-sectional view taken along line 9-9 of FIG. 8.
Figure 8:
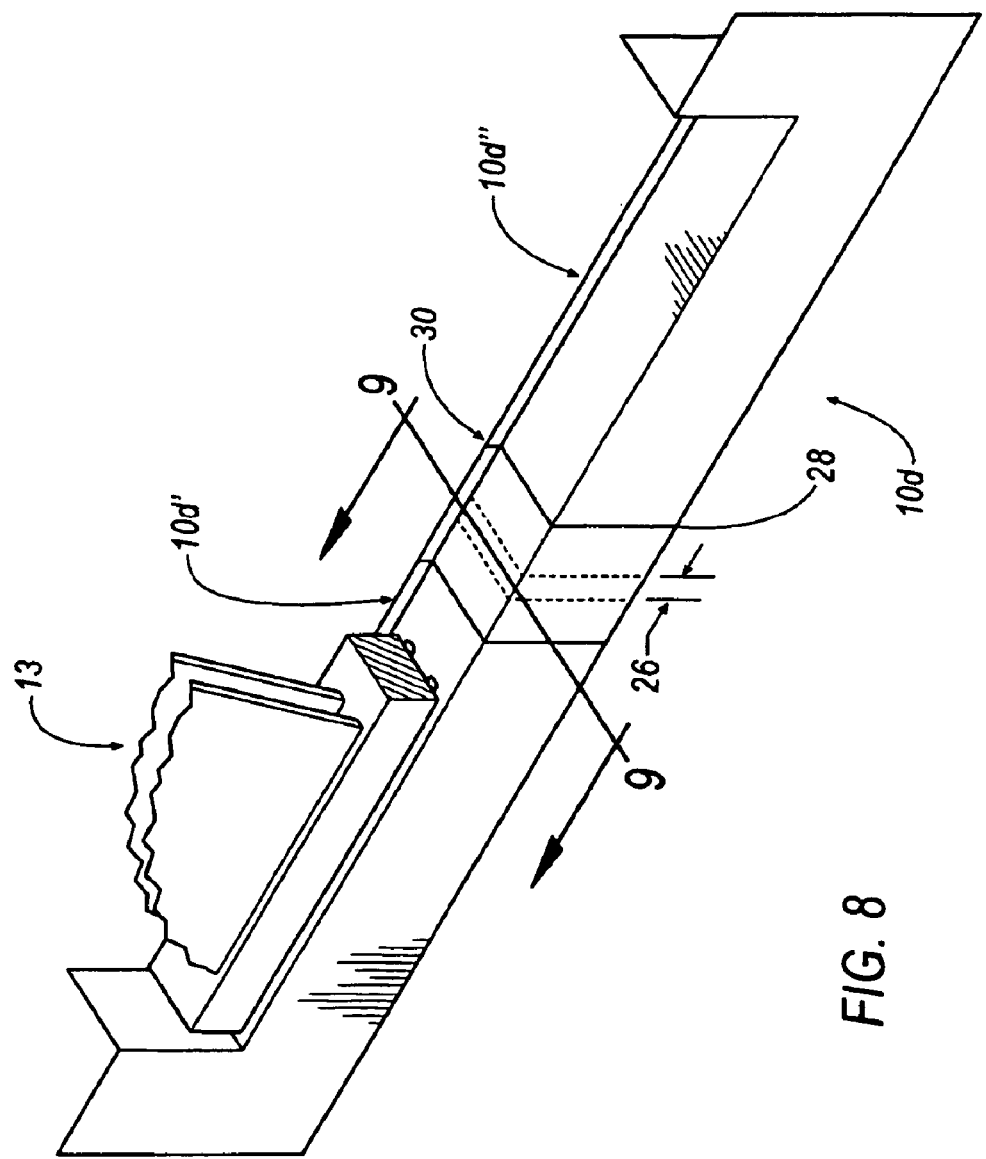
FIG. 8 is an isometric view of the flashing according to still yet another alternate embodiment of the present invention.
Figure 10:
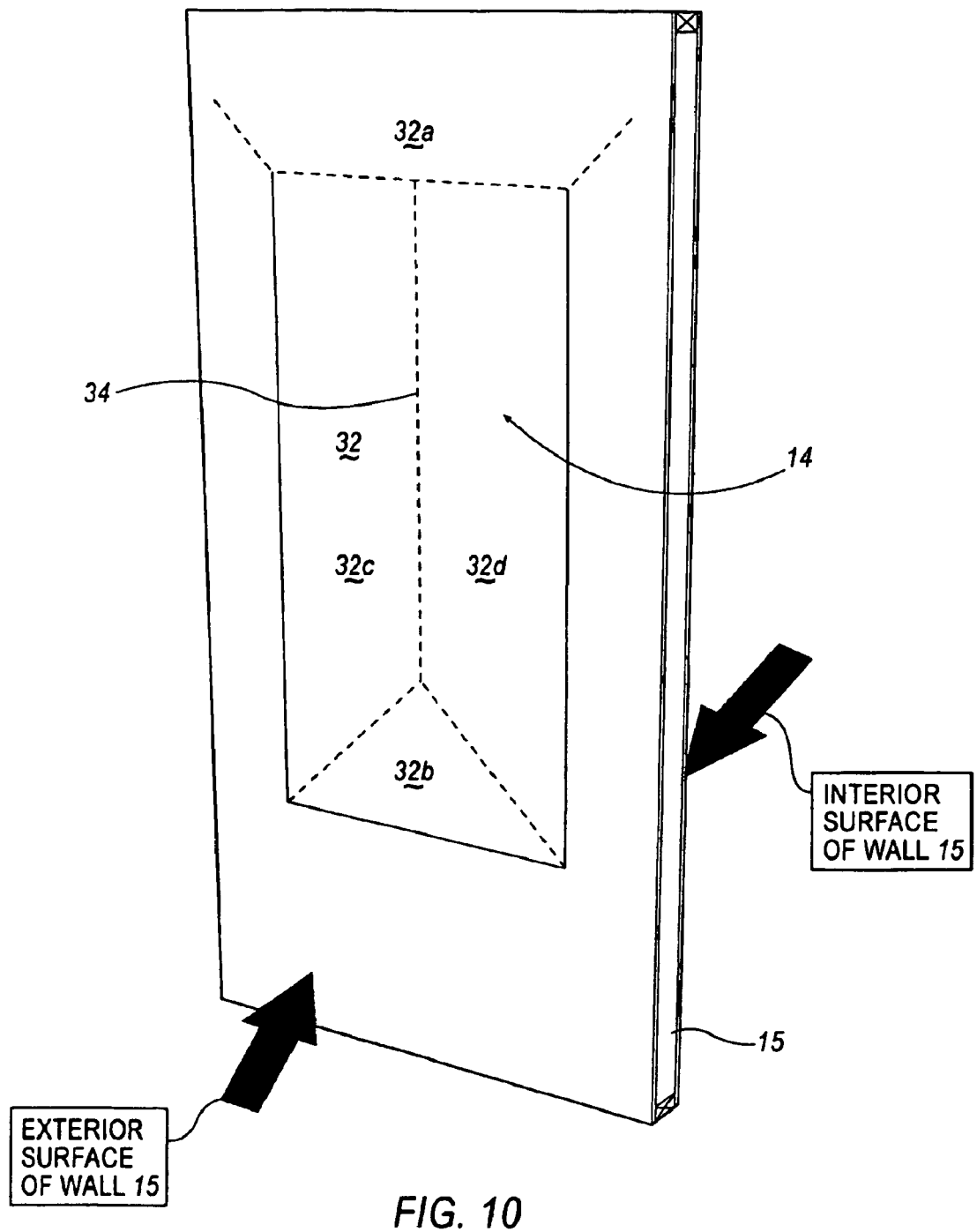
FIG. 10 is a perspective view of a wall having a window opening covered with housewrap.
Figure 11:
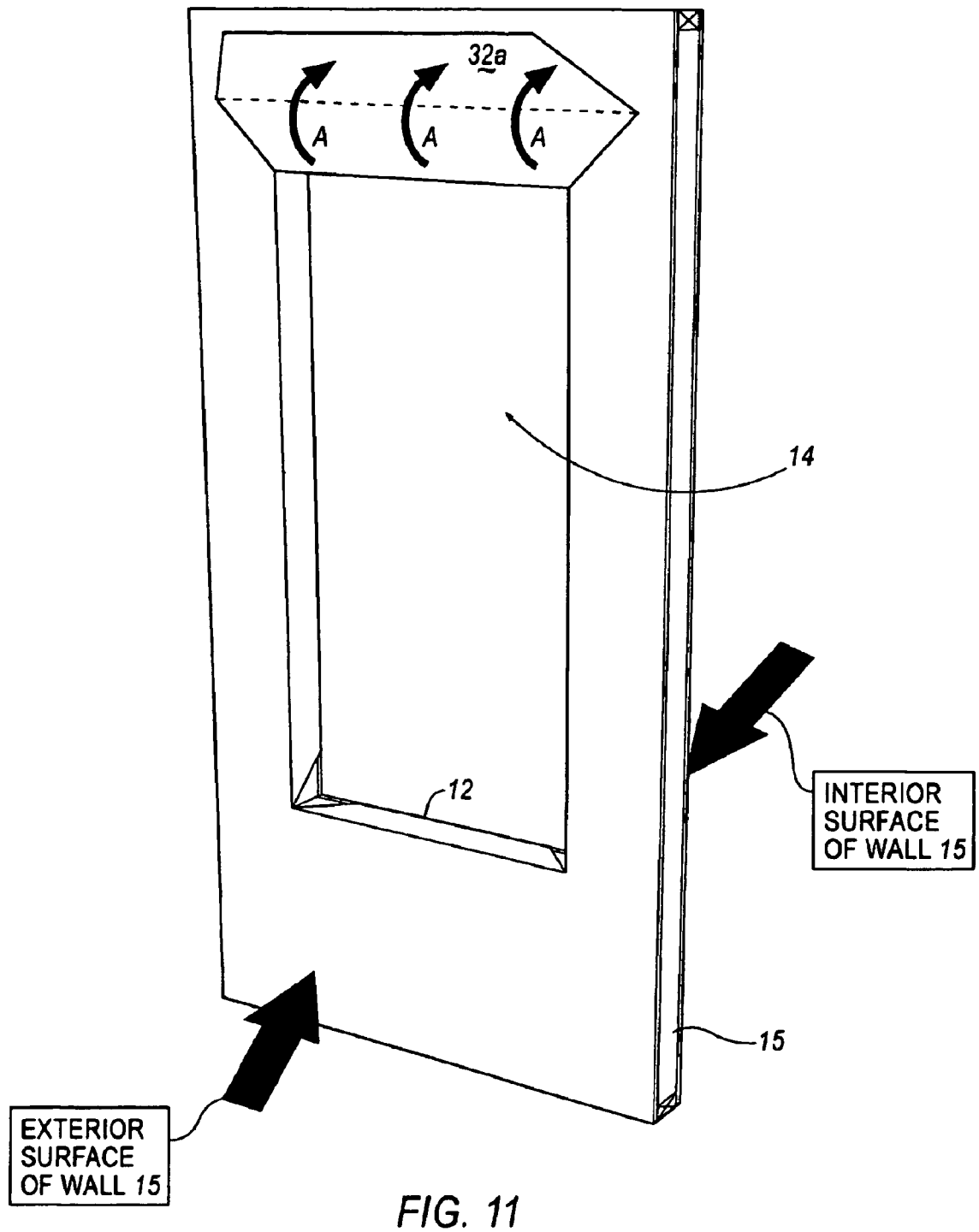
FIG. 11 is a perspective view of a wall having a window opening with the housewrap folded to the proper positions for window installation.
Figure 12:
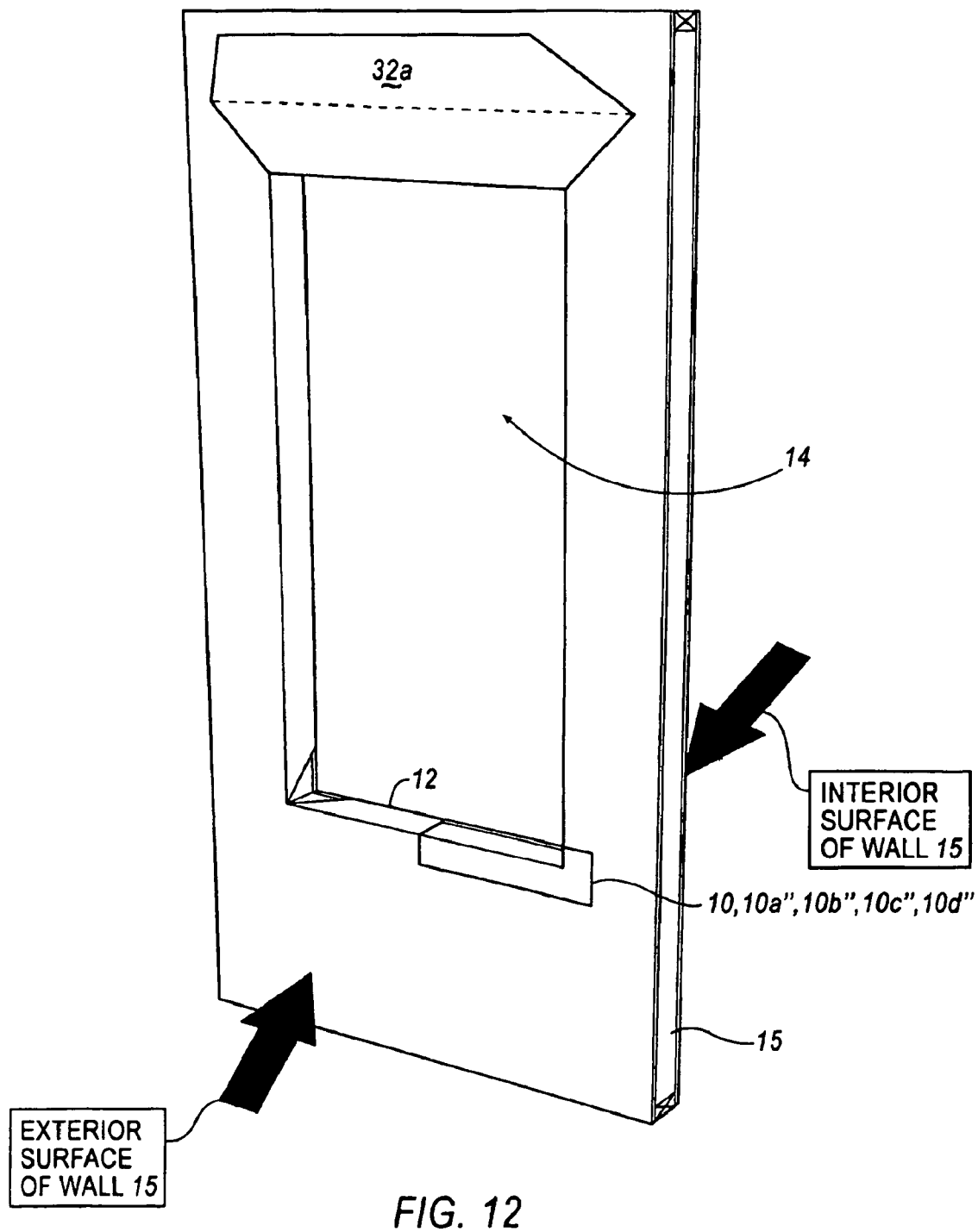
FIG. 12 is a perspective view of a wall having a window opening with a first portion of the flashing of the present invention installed.

FIGS. 8 and 9 illustrate yet another embodiment of the flashing of the present invention. Flashing 10d is substantially similar to flashing 10b; however, flashing 10b includes rear, vertical rising wall 30.

Figure 13:
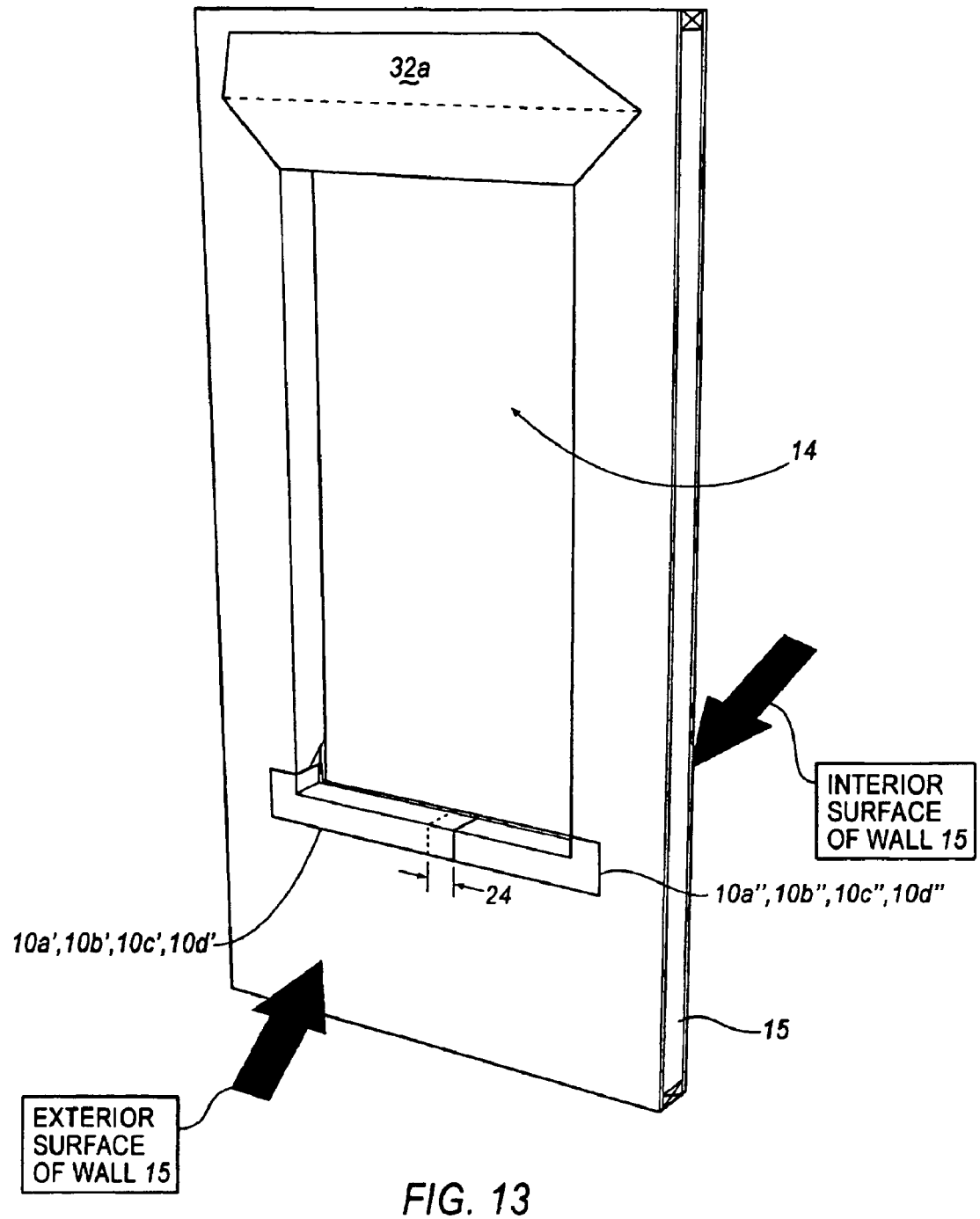
FIG. 13 is a perspective view of a wall having a window opening with a second portion of the flashing installed.
Figure 14:
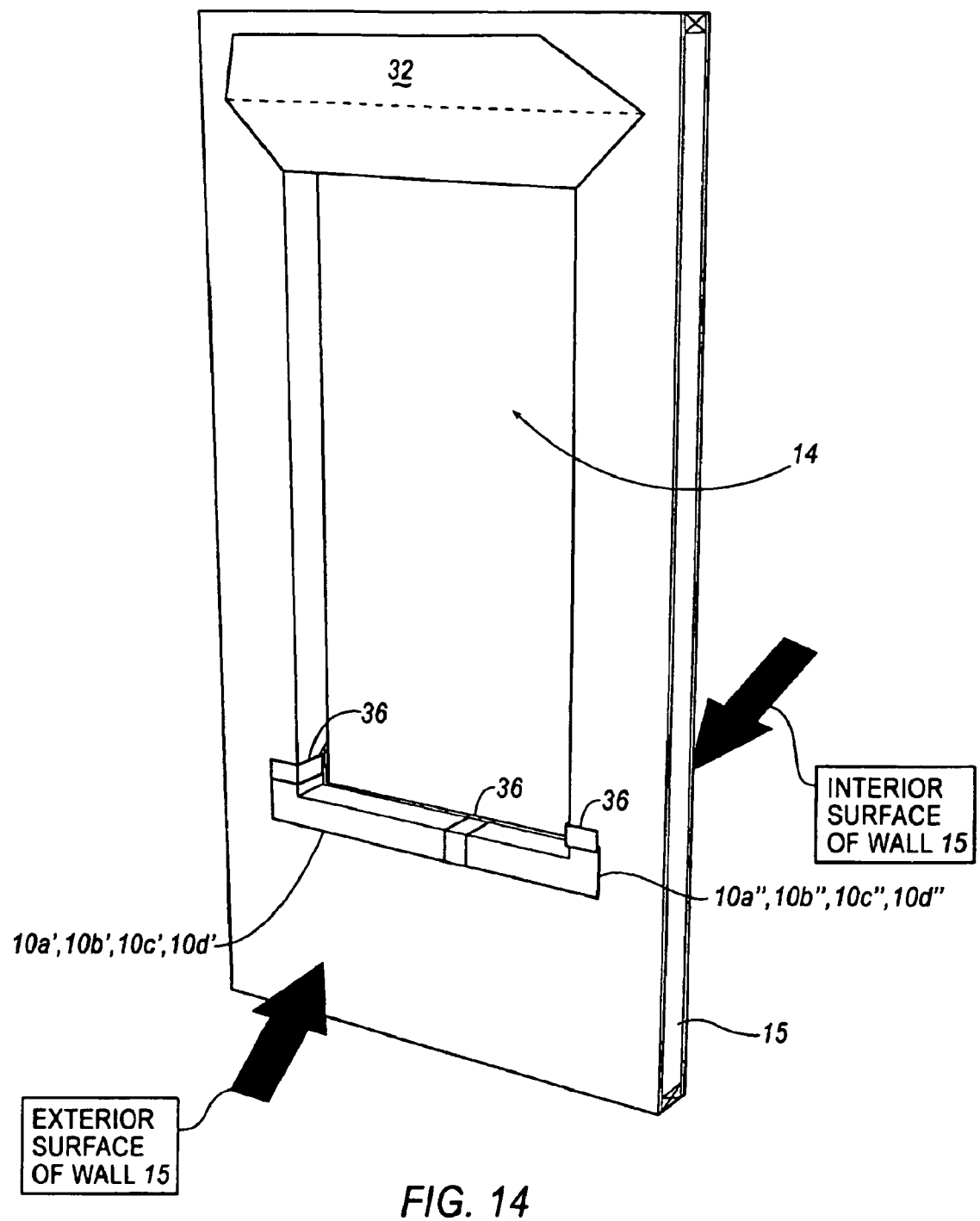
FIG. 14 is a perspective view of a wall having a window opening with two flashing portions taped according to an embodiment of the present invention.

FIGS. 10-14 illustrate the steps for installing flashing 10 within window opening 14. Initially, the window opening 14 is covered with housewrap 32. Housewrap 32 is then cut along perforated lines 34. Perforated lines 34 divide housewrap 32 into upper section 32a, lower section 32b, left side 32c and right side 32d. The lower section 32b and left and right sides 32c, 32d of housewrap 32 are folded inwardly, towards the interior surface of wall 15. Upper section 32a is rolled up towards the exterior of wall 15, in the direction of arrows A (see FIG. 11). Thereafter, flashing 10 or portions of flashing 10a", 10b", 10c" or 10d" are placed on top of bottom portion 12 of window opening 14 (see FIG. 12). FIG. 13 illustrate flashing portions 10a', 10b', 10c', or 10d' being placed along bottom portion 12. Finally, flashing 10 is secured to bottom portion 12. FIG. 14 illustrates flashing 10 being secured to bottom portion 12 with adhesive tape 36. Adhesive tape 36 is also used to seal the seam created by the overlap 24 between right and left portions of the flashing 10. Where there is no overlap 24, adhesive tape 36 may be used to cover the bottom portion 12 of window opening 14. Thereafter, a window 13 is installed within window opening 14.

The flashing 10 of the present invention is preferably manufactured from sheets of thermoforming film, such as a rigid homopolymer vinyl film, or polyvinyl chloride (PVC), or the like. The preferable material properties for flashing 10 are listed in the table below:

| Property | Units | Value |
| --- | --- | --- |
| Gauge Range | Mils | 7.5-35 |
| Gauge Tolerance | % | +/−5 |
| Specific Gravity | — | 1.33 |
| Material Yield (Nominal) | in.$^2$/lb. | 2770 (7.5 mil) |
| | | 2080 (10.0 mil) |
| | | 1390 (15.0 mil) |
| | | 1040 (20.0 mil) |
| Tensile Strength (Yield) | lb./in.$^2$ | 6600 |
| Elongation (Break) | % | 180 |
| Tensile Impact Strength | ft-lb./in.$^2$ | 275 |
| Cold Break Temperature | °C. | −30 |
| Heat Deflection Temperature at 264 psi | °F. | 162 |
| Gloss | % | 115 |

It can be appreciated that the flashing 10 may be covered with a silicone coating for ease of manufacturing and separation of the flashing 10 and for ease in installation of window assembly 13.

Flashing 10 is preferably fabricated using vacuum forming techniques. Vacuum forming flashing 10 from thin gage material allows the first and second side flanges 18, 20 to be substantially perpendicular to base 16. The material properties, including the material thickness, provides flexibility to flashing 10, thus allowing the vacuum forming dies to separate from the flashing 10 once the vacuum forming process is completed. Additionally, vacuum forming flashing 10 allows the material to have a minimum thickness (as thin as 7.5 mm). Therefore, when portions of flashing 10 overlap, the resultant gap under the flashing 10 is minimal and does not allow water intrusions.

Due to the geometry and thinness of flashing 10, flashing 10 cannot be manufactured using an injection molding process. If flashing 10 were to be manufactured by injection molding, the minimum thickness feasible for flashing 10 is 40 mm, significantly higher than the practical thickness of flashing 10 formed by the vacuum forming process. Moreover, to maintain the perpendicularity of surfaces 16, 18, 20 and 22 over the depth of base 16, flashing 10 would require ribs, or support struts, to be molded into base 16. These ribs would detract from the functionality of flashing 10. Furthermore, it would be necessary to include ports along base 16 to ensure that sufficient material flows across and covers the entire base 16. These ports would give rise to dimples, or other imperfections in the surface of base 16. The imperfections could create gaps or openings along the window sill, thereby comprising the water impermeability of flashing 10. Even with the use of ports along base 16, obtaining complete flow coverage of injected material is problematic because the preferred depth of base 16 is in the range of 1 inch to 3 ¼ inches.

The flashing embodiments of the present invention are configured to fit numerous sized window openings. The flashing may be configured to fit window openings up to 65 inches wide or even up to 9 feet wide. Also, it is contemplated that the base may have a width of 4.5 inches. Side flanges may have a height of 8 inches. The front flange may have a height of 4.5 inches. The rear vertical wall, if used, may have a height of 0.25 inches. The thickness of the sill flashing material may be in the range of 0.010 inches, but thinner material in the range of 0.006 inches is also contemplated. The flashing is not limited to plastic material, but can be also aluminum.

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

The invention claimed is:

1. A method of forming a window frame assembly for a building, the method including the steps:

forming an opening in a wall portion for receiving a window assembly, the opening including two opposing corners located at opposite sides of the opening;

providing a one-piece rigid vinyl film member that includes a base portion, first and second side flanges, and a front flange with said side flanges extending from opposing side edges of said base, said side flanges including a front surface, and wherein said first and second side flanges are substantially perpendicular to the base portion wherein the base portion, the first and second side flanges, and the front flange are vacuum formed from one common sheet of rigid vinyl film having a thickness of about 20 mils or less;

cutting in the field and at any point along the one piece member to form at least two corner pieces adapted for placement at the two opposing corners formed by the opening, wherein said two corner pieces include a rear wall projecting upwardly from a rear edge of said base;

attaching the two corner pieces to the two opposing corners, wherein upon attachment a gap is formed between the two corner pieces; and covering the gap between the two corner pieces.

2. The method of claim 1, further comprising the step of applying a wrap to the wall portion for providing protection to the same, wherein the wrap extends at least partially within the opening.

3. The method of claim 1, wherein the base is vacuum drawn to a depth of 1 to 3¼ inches.

4. The method of claim 1, further comprising the step of adhesively bonding a cap to the at least two corner pieces.

5. The method of claim 1, wherein the one piece plastic member comprise a thin gage material having a thickness in the range of 7.5-15 mils.

6. The assembly of claim 3, wherein the one plastic member comprise a thin gage material having a thickness in the range of 7.5-15 mils.

7. The method of claim 1, wherein the attaching step includes a step of fastening.

8. The method of claim 2, further comprising the step of adhesively bonding a cap to the at least two corner pieces.

9. The method of claim 2, further comprising a step of sealing any overlapping seams with adhesive tape.

10. The method of claim 2, wherein the step of cutting occurs in the field to accommodate a width of wall portion opening being constructed.

11. The method of claim 10, further comprising a step of installing the window assembly into the wall portion opening.

12. The method of claim 1, further comprising a step of coating the one piece molded plastic member with a silicone for ease of manufacturing and separation of the flashing and for ease in installation of the window assembly.

13. The method of claim 11, further comprising a step of coating the one piece molded plastic member with a silicone for ease of manufacturing and separation of the flashing and for ease in installation of the window assembly.

14. A method of forming a window frame assembly for a building, the method including the steps:

forming an opening in a wall portion for receiving a window assembly, the opening including two opposing corners located at opposite sides of the opening;

covering the opening with housewrap and cutting the housewrap along perforated lines, wherein the perforated lines divide the housewrap into an upper section, a lower section, a right side and a left side;

folding the lower section, the right side and the left side of the housewrap inwardly, toward an interior surface of the wall;

rolling the upper section of the housewrap upwardly toward an exterior surface of the wall;

providing a one-piece rigid vinyl film member that includes a base portion, first and second side flanges, and a front flange with said side flanges extending from opposing side edges of said base, said side flanges including a front surface, and wherein said first and second side flanges are substantially perpendicular to the base portion wherein the base portion, the first and second side flanges, and the front flange are vacuum formed from one common sheet of rigid vinyl film having a thickness of about 20 mils or less;

cutting the one piece member to form at least two corner pieces adapted for placement at the two opposing corners formed by the opening, wherein said two corner pieces include a rear wall projecting upwardly from a rear edge of said base;

attaching the two corner pieces to the two opposing corners, wherein upon attachment a gap is formed between the two corner pieces;

covering the gap between the two corner pieces.

15. The method of claim 14, wherein the vinyl film member may be cut at any point along its length.

* * * * *

UNITED STATES PATENT AND TRADEMARK OFFICE
CERTIFICATE OF CORRECTION

| | | |
|---|---|---|
| PATENT NO. | : 7,673,426 B2 | Page 1 of 1 |
| APPLICATION NO. | : 11/281986 | |
| DATED | : March 9, 2010 | |
| INVENTOR(S) | : Robert Patrick Broad | |

It is certified that error appears in the above-identified patent and that said Letters Patent is hereby corrected as shown below:

Column 5: Line 16
Claim 6-
The word "ASSEMBLY" should read "METHOD"

Signed and Sealed this

Twentieth Day of April, 2010

David J. Kappos
*Director of the United States Patent and Trademark Office*